US012691551B2

(12) United States Patent
Porta

(10) Patent No.: US 12,691,551 B2
(45) Date of Patent: Jul. 28, 2026

(54) SELF-CENTERING VISE

(71) Applicant: PORTA SOLUTIONS S.P.A., Villa Carcina (IT)

(72) Inventor: Carlo Porta, Villa Carcina (IT)

(73) Assignee: PORTA SOLUTIONS S.P.A., Villa Carcina (IT)

( * ) Notice: Subject to any disclaimer, the term of this patent is extended or adjusted under 35 U.S.C. 154(b) by 420 days.

(21) Appl. No.: 18/553,507

(22) PCT Filed: Mar. 8, 2022

(86) PCT No.: PCT/IB2022/052026
§ 371 (c)(1),
(2) Date: Sep. 29, 2023

(87) PCT Pub. No.: WO2022/208190
PCT Pub. Date: Oct. 6, 2022

(65) Prior Publication Data

US 2024/0181602 A1 Jun. 6, 2024

(30) Foreign Application Priority Data

Mar. 29, 2021 (IT) ........................ 102021000007670

(51) Int. Cl.
*B25B 1/02* (2006.01)
*B25B 1/18* (2006.01)
*B25B 1/24* (2006.01)

(52) U.S. Cl.
CPC .................. *B25B 1/02* (2013.01); *B25B 1/18* (2013.01); *B25B 1/2489* (2013.01)

(58) Field of Classification Search
CPC . B25B 1/02; B25B 1/18; B25B 1/2489; B25J 15/0253
See application file for complete search history.

(56) References Cited

U.S. PATENT DOCUMENTS 3,899,162 A * 8/1975 Fischer ..................... B25B 1/02 269/25
4,693,948 A * 9/1987 McEwan ............. H01M 50/561 429/1

(Continued)

FOREIGN PATENT DOCUMENTS

IT 102021000007670 A1 9/2022

OTHER PUBLICATIONS

International Search Report and Written Opinion, dated Jun. 3, 2022, PCT Application No. PCT/IB2022/052026, filed Mar. 8, 2022.

*Primary Examiner* — Seahee Hong

(57) ABSTRACT

A self-centering vise having reduced vertical size capable of exerting on workpieces a force exceeding 2000 kg. The vise comprises a body, two or more jaws constrained to the body and actuators of the jaws. The jaws can be moved close to and away from a workpiece gripping axis. Each actuator comprises a thrust element susceptible to displacements by a pressurized fluid. Each jaw comprises two guides inclined and symmetrical with respect to the displacement direction of the same jaw, and the thrust element of each actuator comprises two walls inclined and symmetrical with respect to the displacement direction of the same thrust element. Each actuator exerts its thrust simultaneously on two jaws, by slidingly engaging the guides of two jaws with its own inclined walls, according to a configuration that can be defined double inverted wedge configuration.

14 Claims, 7 Drawing Sheets

(56) References Cited

U.S. PATENT DOCUMENTS

| | | | | |
|---|---|---|---|---|
| 4,913,481 | A | 4/1990 | Chin et al. | |
| 5,125,708 | A * | 6/1992 | Borcea | B25J 15/028 294/207 |
| 6,799,767 | B2 * | 10/2004 | Kuroda | B25B 1/08 279/115 |
| 10,099,384 | B1 * | 10/2018 | Kesil | B25J 15/0028 |
| 10,843,311 | B2 * | 11/2020 | Kirsten | B25J 15/028 |

* cited by examiner

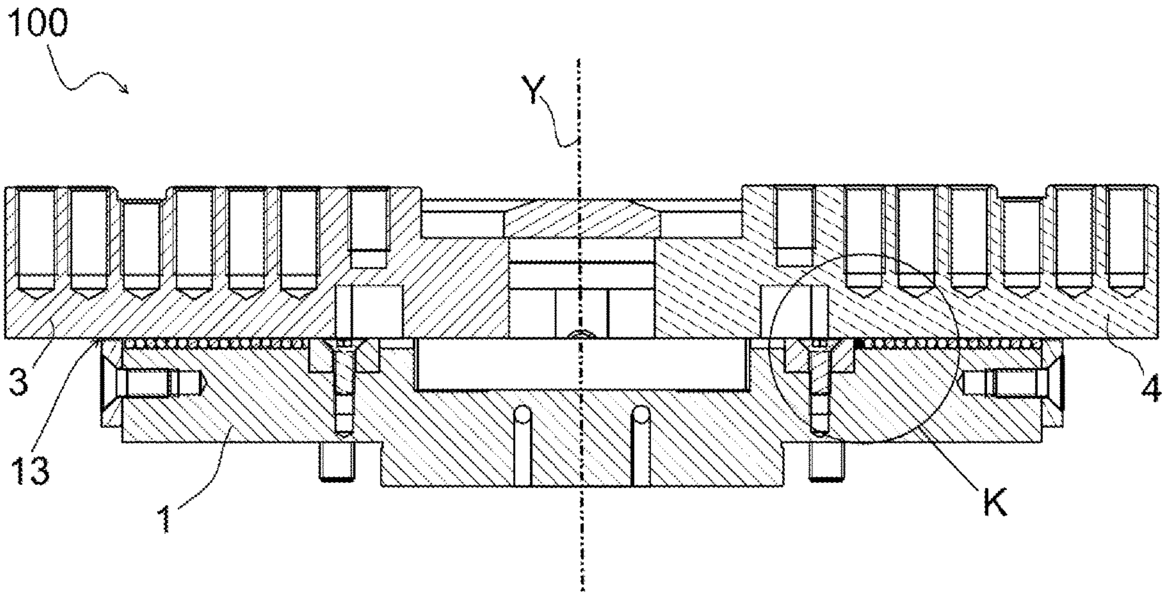
Fig. 5
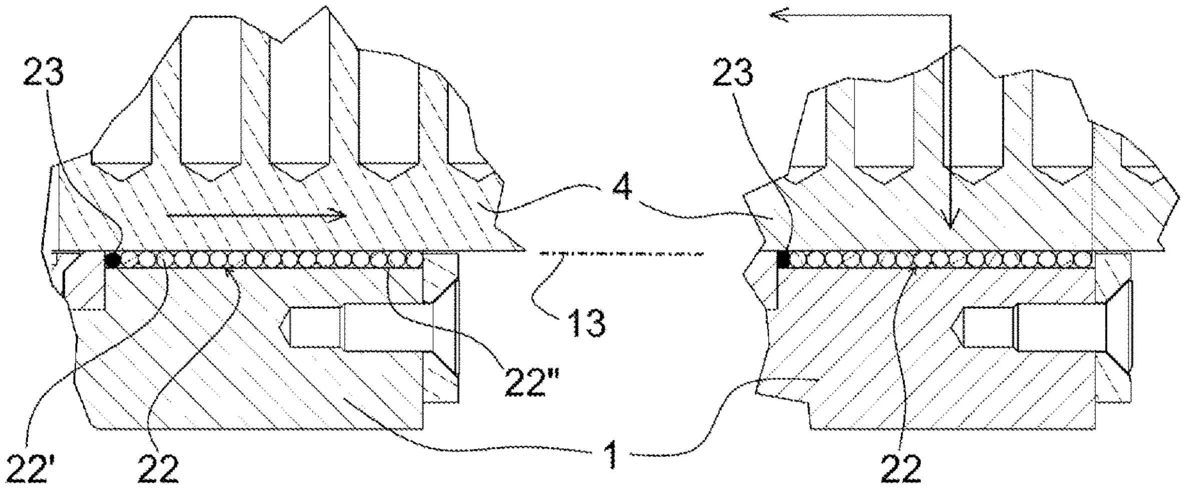
Fig. 6
Fig. 7

SELF-CENTERING VISE

CROSS REFERENCE TO RELATED APPLICATIONS

This application is a filing under 35 U.S.C. 371 of International Application No. PCT/IB2022/052026, filed Mar. 8, 2022, entitled "Self-Centering Vise," which claims priority to Italian Patent Application No. 102021000007670, filed Mar. 29, 2021, which applications are incorporated by reference herein in their entirety.

FIELD OF THE INVENTION

The present invention relates to a self-centering vise, particularly for machining centers and CNC numerical-control machines, and more specifically relates to a self-centering hydraulic vise having reduced vertical size.

STATE OF THE ART

Often, in the context of numerical-control machine tools, vises whose function is to hold the workpieces being machined in a precise position with respect to a tool spindle, are used. Basically, the vise holds the workpiece while the tool machines it, such as for example milling or drilling it.

Although the vises used in machine tools are mostly operated by pressurized oil, i.e. they are hydraulic vises, in general vises can be operated by compressed air as well, i.e. there are also pneumatic vises, or else mechanically, with a screw mechanism that can be operated manually or by an electric motor.

Regardless of the fluid used for the activation, a vise traditionally comprises a body that can be fixed to a working plane or machine tool, and at least two jaws movable with respect to the body, close to or away from each other, in response to stresses imparted by the fluid, to clamp and release the workpiece each time machined.

In manual vises, the operation is controlled by the operator through a lever or a handwheel.

In numerical-control machine tools, the activation of a hydraulic or pneumatic vise is controlled by an electronic control unit, which operates the pump (hydraulic or pneumatic), which in turn pressurizes the fluid, and operates a system of valves that allows pressurized fluid to be fed, selectively upstream or downstream of the jaws, in order to cause the opening (approaching movement) or closing (distancing movement) thereof.

In order to minimize the overall dimensions of the vise, in applications on numerical-control machine tools, the pump is positioned remote from the vise and the pressurized fluid is conveyed to the vise by special ducts generally made of metal and having small diameter, which connect the pump to the vise body.

However, despite this measure, the Applicant has found that the vises currently available on the market still have excessive overall dimensions, especially as regards the height, and this imposes a limitation on the machine tool designer, who has to compensate for the height of the vise in the machine tool design by providing appropriate working spaces for the tools.

In addition, the hydraulic vises available on the market fed with pressurized oil at 100 bars, for applications on CNC machines, provide a clamping force of less than 1000 kg.

For the purposes of the present invention, a height size greater than 10 cm is considered excessive: in order to optimize working spaces in modern numerical-control machines, it is desirable to have vises that are not only effective but also have vertical size of less than 10 cm.

By the way, the vises currently available among those with reduced vertical size are mostly non-self-centering. A vise is self-centering when its jaws move synchronously to bring and hold the workpiece exactly on the longitudinal axis of the vise. In a non-self-centering vise, this does not happen and the jaws are not synchronized: for example, one jaw may be stationary and another jaw may move away and closer from/to it.

U.S. Ser. No. 10/099,384B1 and U.S. Pat. No. 4,913,481A disclose solutions known in the art, with characteristics according to the preamble of claim 1.

SUMMARY OF THE INVENTION

Object of the present invention is therefore to provide a self-centering vise which has small vertical size and which is effective, particularly for applications on machining centers and CNC numerical-control machines, and preferably a hydraulic vise.

Therefore, a first aspect of the present invention relates to a vise according to claim 1.

In particular, the present invention relates to a vise comprising a body, two or more jaws constrained to the body, and actuators of the jaws. The jaws are movable with respect to the body, on a common lying plane of the jaws, close to and away from a workpiece gripping axis, to clamp on this workpiece gripping axis a workpiece to be machined and to release the workpiece, in response to the stresses imparted by said actuators.

Each actuator comprises a thrust element that is susceptible to displacements parallel to the lying plane of the jaws, and preferably on said lying plane, in response to the stresses imparted by a fluid fed to the vise, such as compressed air if the vise is a pneumatic one or pressurized oil if the vise is hydraulic.

Each jaw comprises two guides inclined and symmetrical with respect to the displacement direction of the same jaw, i.e., two guides defining a first angle between them. Basically, the guides define a wedge-shaped path.

The thrust element of each actuator comprises two walls inclined and symmetrical with respect to the displacement direction of the same thrust element, i.e., a second angle is defined between the two inclined walls, so that they are divergent. Practically, the inclined walls define a wedge element.

Each actuator exerts its thrust simultaneously on two jaws, by slidingly engaging the guides of two jaws with its own inclined walls, according to a configuration that can be defined double inverted wedge configuration. This feature makes the vise self-centering.

The described configuration, where the thrust elements move on a plane parallel to the lying plane of the jaws and preferably on this plane, and exert their function simultaneously on two jaws, i.e. each actuator is shared by two jaws, makes the height of the self-centering vise particularly compact and at the same time lends considerable efficiency.

The Applicant produced a prototype of hydraulic vise with two jaws, which is fed with oil at a pressure of 100 bars and whose body has a height extent equal to 69.5 mm and the clamping force between the jaws was equal to about 2200 kg, and even equal to about 3180 kg in a version of the vise equipped with roller bearings described below: Considering a height size of less than 7 cm, this is a considerable clamping force, higher than the clamping force that characterizes the vises available on the market.

Preferably the vise is axially symmetrical with respect to the workpiece gripping axis.

Preferably each actuator is interposed between two jaws and the displacement direction of one jaw is transverse to the displacement direction of the corresponding thrust elements, and at most these two directions are orthogonal in the vise version with two jaws.

Preferably, the actuators are hydraulic or pneumatic and each comprises a cylinder obtained in the body of the vise, and a piston movable in the cylinder due to the pressure of the fluid fed from outside to the vise. The thrust element is outside the cylinder but is fixed to the piston and moves in conjunction with the piston. The piston is susceptible to forward and backward movements depending on whether the pressurized fluid is fed into the cylinder, upstream or downstream of the piston, i.e., ahead the piston or behind the piston, depending on whether the vise clamps the workpieces when opening or closing.

In the preferred embodiment, a shaft connects the piston to the inclined walls of the actuator. The shaft is slidingly and sealingly inserted through a corresponding seat of the vise body, and is offset from the piston. In other words, the shaft connecting the piston to the inclined walls of the actuator is not coaxial with the piston but is—indeed—offset. This allows the cylinder wall to remain thick enough to accommodate delivering passages of the pressurized fluid.

In more detail, the cylinder of each actuator is included between an upper wall and a lower wall of the vise body. The delivering passages of a pressurized fluid are obtained in one of the upper and lower walls, i.e. in the distal wall with respect to the actuator shafts.

This configuration where the shaft is offset, for example by 3-5 mm with respect to the axis of the piston, allows the fluid passages to be obtained in the body of the vise, as an alternative to the use of external ducts, which can be bulky and problematic in CNC working machines.

Preferably, the angle between the inclined walls of the actuators is in the range 20°-60° and corresponds to the angle between the guides of each jaw; meaning that the two angles are equal.

In practice, the inclined walls of the thrust elements, that are slidingly inserted into the jaw guides, achieve an inclined-plane coupling: the thrust exerted by the actuator along the direction of displacement of the respective thrust element causes the jaws functionally coupled thereto to move along the respective directions of displacement, when opening or closing.

In the preferred embodiment, the vise comprises two jaws. The jaws are arranged on the body of the vise opposite each other with respect to the workpiece gripping axis and are translatable along a first direction, or first axis of displacement. The vise comprises two actuators as well, arranged opposite each other with respect to the workpiece gripping axis. The thrust elements of the actuators move along a second direction, or second axis of displacement, orthogonal to the first direction, or first axis of displacement (of the jaws). In this configuration, a 90° angle is defined between a vise and the adjacent actuator. Preferably, the angle between the inclined walls of the actuators is equal to 30°.

In another embodiment, the vise has three jaws and three actuators. The jaws are arranged around the workpiece gripping axis in a 120° configuration and the three actuators are also arranged around the workpiece gripping axis in a 120° configuration: each actuator is interposed between two jaws, more specifically it is in an intermediate position.

Preferably, the vise comprises a roller bearing interposed between the vise body and each jaw: Rollers, e.g. hardened steel rollers, define the lying plane of the jaws, meaning that the jaws move over the rollers, resting directly on them. Preferably, the roller races, i.e., the seats of the vise body on which the rollers move, are made of cemented steel and are ground, up to the achievement of a hardness of 58-62 HRC, and are coated with a layer equal to 3-4 thousandths of a millimeter of a self-lubricating material.

Preferably, the roller bearings comprise an element elastically deformable between a deformed configuration, at which the elastic element is squeezed between the rollers and the vise body when the jaws are closed on the workpiece to be held, and an undeformed configuration, when the jaws are open.

Even more preferably, the elastic element is positioned radially more inwardly of the rollers with respect to the workpiece gripping axis and remains confined between the vise body, the rollers and the jaws.

The function of the elastic element is as follows. By using the vise to clamp and hold a workpiece on the workpiece gripping axis, the actuators are activated to push the jaws which simultaneously move to close on the workpiece, thus causing the elastic element to deform. Some machining operations require a reduction in the pressure exerted on the workpiece, as long as it is still held between the jaws. Under these circumstances, the grip of the jaws on the workpiece to be machined is loosened as much as needed to return the elastic element to the undeformed configuration: when the elastic element returns to the undeformed configuration, this controlled reduction of the jaw clamping force is achieved.

BRIEF DESCRIPTION OF THE FIGURES

Further characteristics and advantages of the invention will be more evident by the review of the following detailed specification of a preferred, but not exclusive, embodiment, which is depicted for illustration purposes only and without limitation, with the aid of the attached drawings, in which:

FIG. 5 is a (vertical) sectional view of the vise shown in FIG. 1, considered on the plane M-M of FIG. 1, with the vise open;

FIG. 6 is an enlargement of the portion K of FIG. 5, with the vise closed;

FIG. 7 is an enlargement of the portion K of FIG. 5, with the vise open;

DETAILED DESCRIPTION OF THE INVENTION

Figure 1:
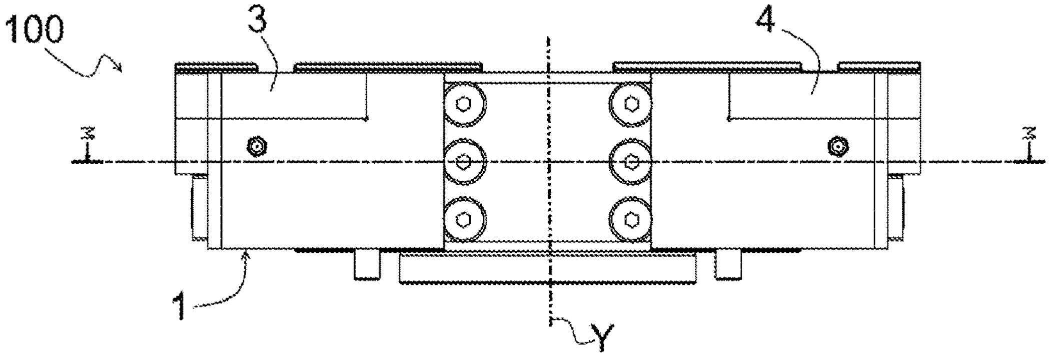
FIG. 1 is a front and elevation view of a vise according to the present invention, having two jaws.

FIG. 1 is a front and elevation view of a first embodiment of the vise 100 according to the present invention. The numerical reference 1 denotes the body of the vise 100, and the numerical references 3 and 4 denote the jaws. As a matter of fact, it is a vise 100 with two opposite jaws.

Figure 2:
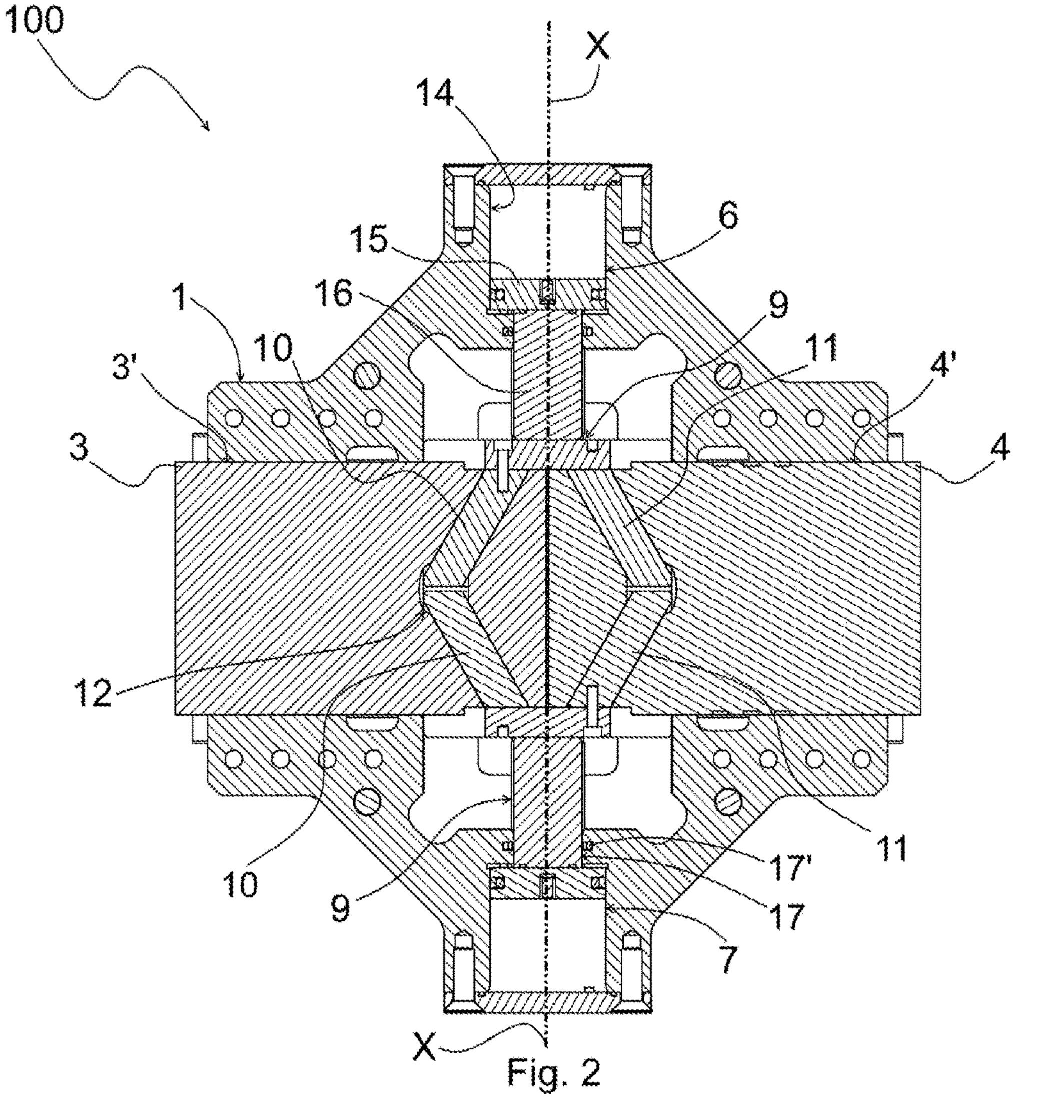
FIG. 2 is a (horizontal) sectional view of the vise shown in FIG. 1, considered on the plane M-M of FIG. 1, with the vise closed.

FIG. 2 is a sectional plan view considered on the plane M-M of FIG. 1. The vise 100 is shown closed, that is, with the jaws 3 and 4 in abutment against each other. As can be seen, the jaws 3 and 4 are housed in respective seats 3' and 4' obtained in the body 1 and, as will be clear from the following description, they are slidable into these seats 3', 4' in order to close the vise 100 by moving close to each other, and to open the vise 100 by moving away from each other.

Two actuators 6 and 7 of the jaws 3 and 4 are also housed in the body 1. In the example shown, the actuators 6 and 7 are hydraulic actuators, i.e., fed with pressurized oil, e.g. up to 100 bars. In particular, each actuator 6, 7 comprises a cylinder 14 within the body 1 of the vise 100, in which a piston 15 moves in alternating motion in response to the thrust exerted by the pressurized oil, which can be fed ahead or behind the piston 15 via suitable oil passages 20 that will be described further below.

The pistons 15 of the actuators 6 and 7 move in alternating motion on the axis X-X (direction of piston displacement), which is orthogonal to the direction along which the jaws 3 and 4 move. A thrust element 9 is fixed to each piston 15. The thrust element 9 comprises a substantially cylindrical element 16 definable as a shaft, which extends through a corresponding seat 17 of the body 1 of the vise 100, thus achieving with the latter a slidable and sealing coupling thanks to an O-ring seal 17'. The shaft 16 supports two walls 10 and 11 that are inclined, and in particular divergent, with respect to the axis X-X and whose height extent is on planes orthogonal to the lying plane of the jaws 3 and 4. In the example shown in the figures, the angle between the inclined walls 10 and 11 is 30°: in general, this angle is in the range 20°-60°.

Figure 3:
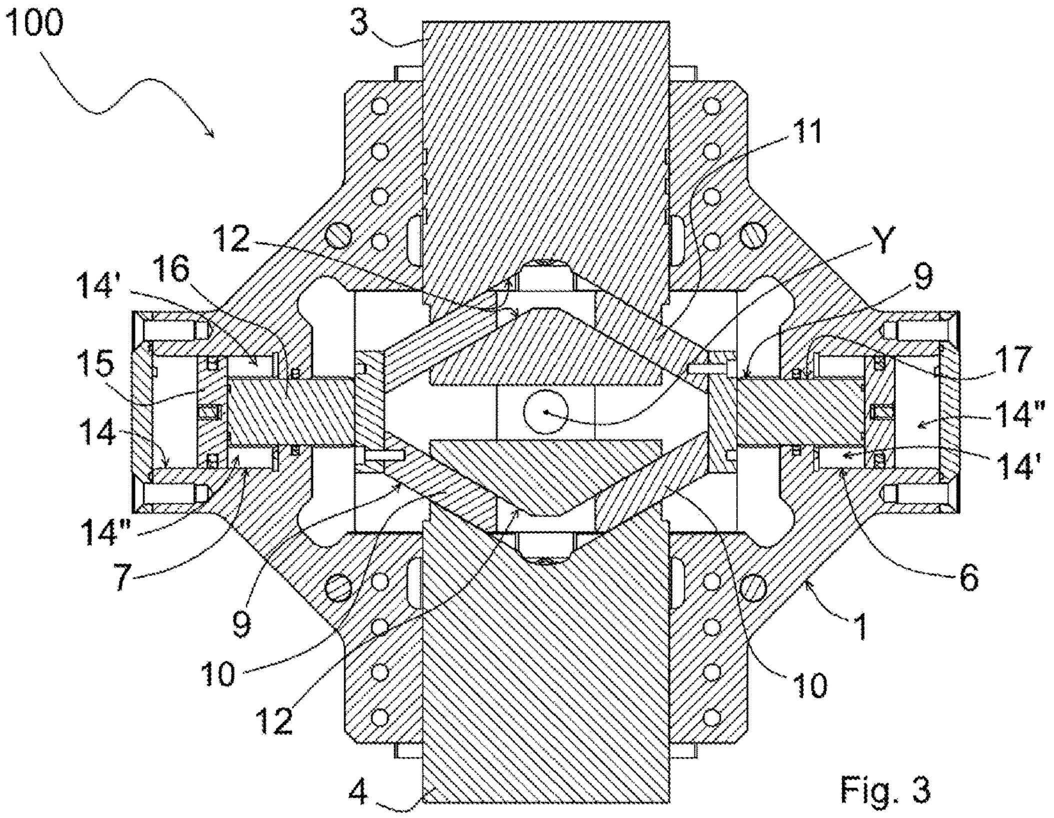
FIG. 3 is a sectional view of the vise shown in FIG. 1, considered on the plane M-M of FIG. 1, with the vise in an intermediate configuration between the open and closed configuration.

FIG. 3 is a sectional plan view considered on the plane M-M of FIG. 1. Comparing FIGS. 2 and 3, it can be seen that in FIG. 3 the jaws 3 and 4 are spaced apart from each other, and in particular they are in an intermediate position between the closed position shown in FIG. 2, and the open position shown in FIG. 4.

The reference Y denotes the workpiece gripping axis, i.e. the axis, perpendicular to the lying plane of the jaws 3 and 4, along which a workpiece is held by the vise 100 when the jaws 3 and 4 are closed on the workpiece.

As can be seen, the inclined walls 10 and 11 slidingly engage corresponding guides 12 of the jaws 3 and 4 which are inclined guides and converge like the walls 10 and 11. Preferably, the guides 12 are formed directly in the jaws 3 and 4 by removing material from solid. Substantially, the guides 12 define in each jaw 3, 4 a wedge-shaped guide in which the walls of the thrust element 9 of both actuators 6, 7 are simultaneously engaged. In particular, the guides 12 of the jaw 3 are simultaneously engaged by the wall 11 of the actuator 6 and the wall 11 of the actuator 7: the guides 12 of the jaw 4 are simultaneously engaged by the wall 10 of the actuator 6 and the wall 10 of the actuator 7.

Herein, this configuration is referred to as double reverse wedge and allows the movement of the jaws 3 and 4 to be synchronously controlled, that is, such that jaws 3 and 4 move in sync. This measure makes the vise 100 self-centering, that is, it allows the workpieces to be always clamped on the workpiece gripping axis Y, and allows the same clamping force to be applied by the two jaws 3 and 4, that is, a jaw 3 always exerts on the workpiece the same pressure of the other jaw 4.

In FIG. 3, the actuators 6 and 7 are shown with the respective pistons 15 in a more rearward position in the respective cylinder 14, compared to the fully forward position shown in FIG. 2. The displacement of the pistons 15, caused by the action of the pressurized oil fed ahead of the piston 15, precisely in the volume 14', causes the thrust element 9 and, therefore, also the inclined walls 10 and 11 to move backward, resulting in the inclined walls 10 and 11 slipping out of the respective guides 12 of the jaws 3 and 4. Due to the 30° angle formed between the guides 12 of the same jaw 3 or 4 or between the walls 10 and 11 of the same actuator 6 or 7, as the walls 10 and 11 slip out this causes the jaws 3 and 4 to have a corresponding displacement that opens them, i.e. the jaws 3 and 4 move apart.

Since the vise 100 is made to be symmetrical with respect to the workpiece gripping axis Y, i.e., the actuators 6-7 are symmetrical with respect to the axis Y, and the jaws 3-4 are also symmetrical with respect to the axis Y, the movements of the jaws 3 and 4 can only be synchronous. Thank to this arrangement the vise is self-centering, i.e., the jaws 3-4 move to close on the workpiece to be clamped on the axis Y simultaneously. Furthermore, a given displacement of the pistons 15 results in a corresponding and univocal displacement of both the jaws 3 and 4.

Evidently, if pressurized oil is not injected into the volume 14' but instead into the volume 14", i.e., behind the piston 15, this results in the reverse movement of the jaws 3 and 4, which close.

Figure 4:
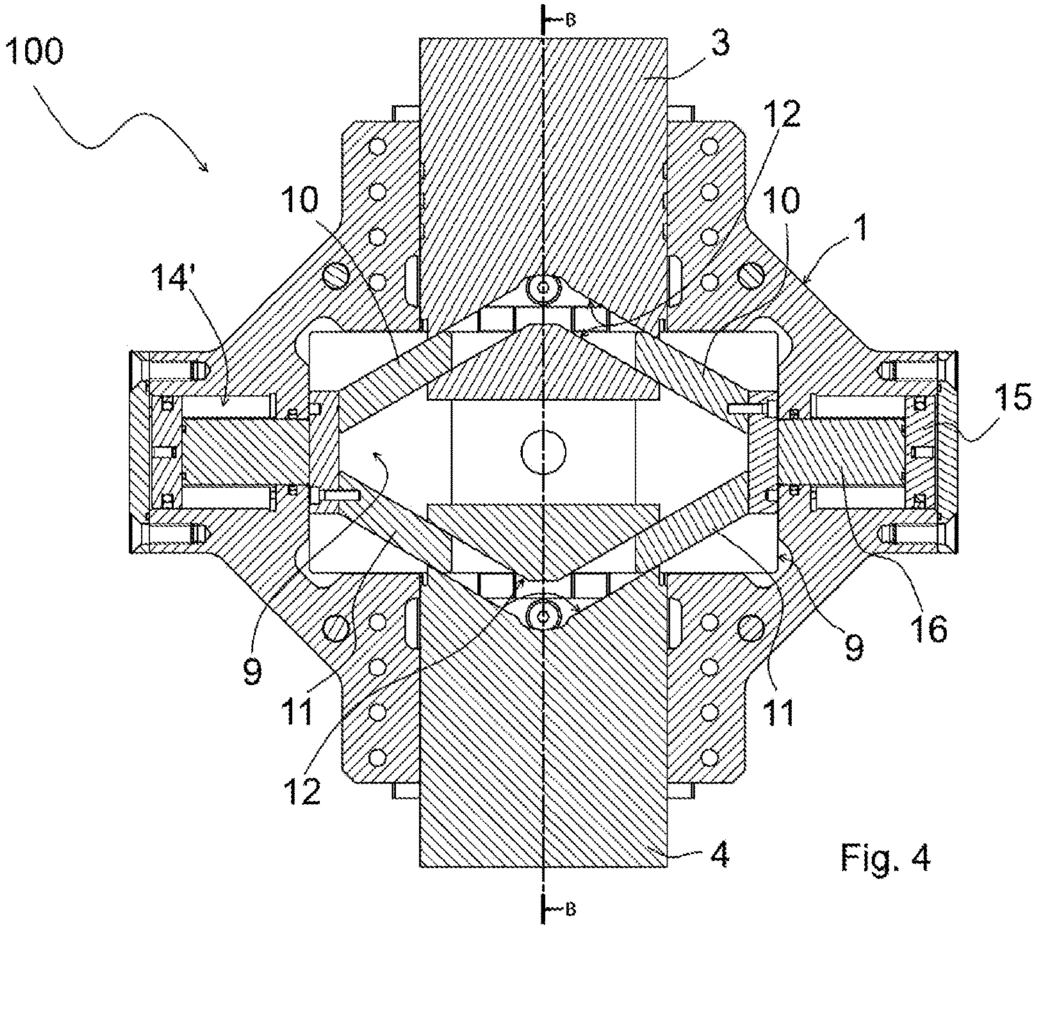
FIG. 4 is a sectional view of the vise shown in FIG. 1, considered on the plane B-B of FIG. 4, with the vise open.

FIG. 4 is a sectional plan view considered on the plane M-M of FIG. 1. Comparing FIGS. 2, 3 and 4, it can be seen that in FIG. 4 the jaws 3 and 4 are fully open: the pistons 15 have reached the bottom dead point in the corresponding cylinder 14. The inclined walls 10 and 11 remain partially inserted in the respective seats 12 of the jaws 3 and 4, i.e. they never come out completely.

FIG. 5 is a vertical sectional view considered on the plane B-B of FIG. 4, which is the same plane on which the axis of displacement of the two jaws 3 and 4 lies. Reference number 13 denotes the lying plane of the jaws 3 and 4, which is the sliding plane as well. In the preferred embodiment of the present invention, shown in the figures, the lying and sliding plane 13 is defined by a roller bearing shown enlarged in FIGS. 6 and 7.

FIGS. 6 and 7 are enlargements of the circled portion K of FIG. 5 and show the jaw 4 during an opening movement, or while gripping a workpiece with reduced force, and in the position closed on a workpiece positioned on the workpiece gripping axis Y, respectively. A bearing 22 with rollers 22' is inserted between the jaws 3 and 4 and the body 1 of the vise 100: the upper surface of the rollers defines the lying and sliding plane 13 of the jaws 3 and 4. The rollers 22' are metal rollers that roll on a race 22". Preferably, the race 22" is cemented, hardened and ground to a hardness in the range of 58-62 HRC.

In the bearing 22 of at least one of the two jaws 3-4 (in the example shown in the figures it is present under the jaw 4), an elastic element 23, for example a gasket elastically deformable between a squeezed configuration and a configuration with a circular cross-section, with a diameter equal to that of the rollers 22', is inserted between the first roller 22' of the bearing 22 and the body 1 of the vise 100, i.e. in a position radially more inward with respect to the axis Y. The elastic element 23 has this function:

- when the vise 100 is open, or opening, the elastic element 23 is in the undeformed configuration and takes a space corresponding to that of a roller 22', i.e., its cross section is the same as that of a roller 22';
- when the vise 100 move to close, as shown in FIG. 7, i.e. the jaws 3 and 4 are brought into abutment against a workpiece to be clamped on the axis Y, the elastic element 23 is compressed and takes the deformed, squeezed configuration;
- some machining operations require the reduction of the clamping force applied by the jaws 3 and 4 on the workpiece and, for this reason, advantageously the jaws 3 and 4 can be slightly spaced apart just enough to return the elastic element 23 to its initial undeformed configuration, as shown in FIG. 6, even though sufficient force is still exerted on the workpiece to keep it clamped on the workpiece gripping axis Y.

The backward movement of the jaws 3 and 4 to achieve the elastic recovery of the elastic element 23 and to grip the workpiece with reduced pressure is less than 1 mm.

Figure 8:
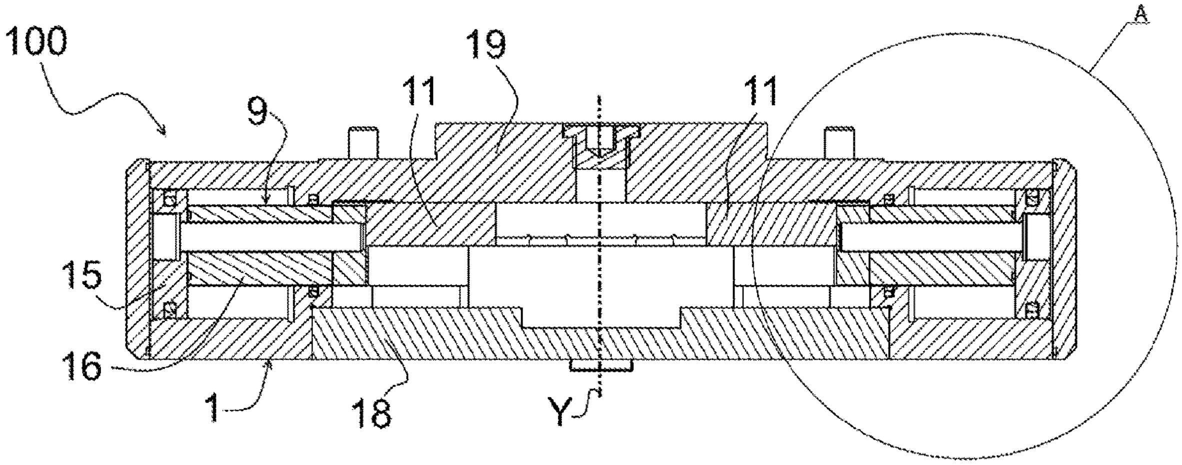
FIG. 8 is a vertical sectional view of the vise shown in FIG. 1, considered on a median plane.
Figure 9:
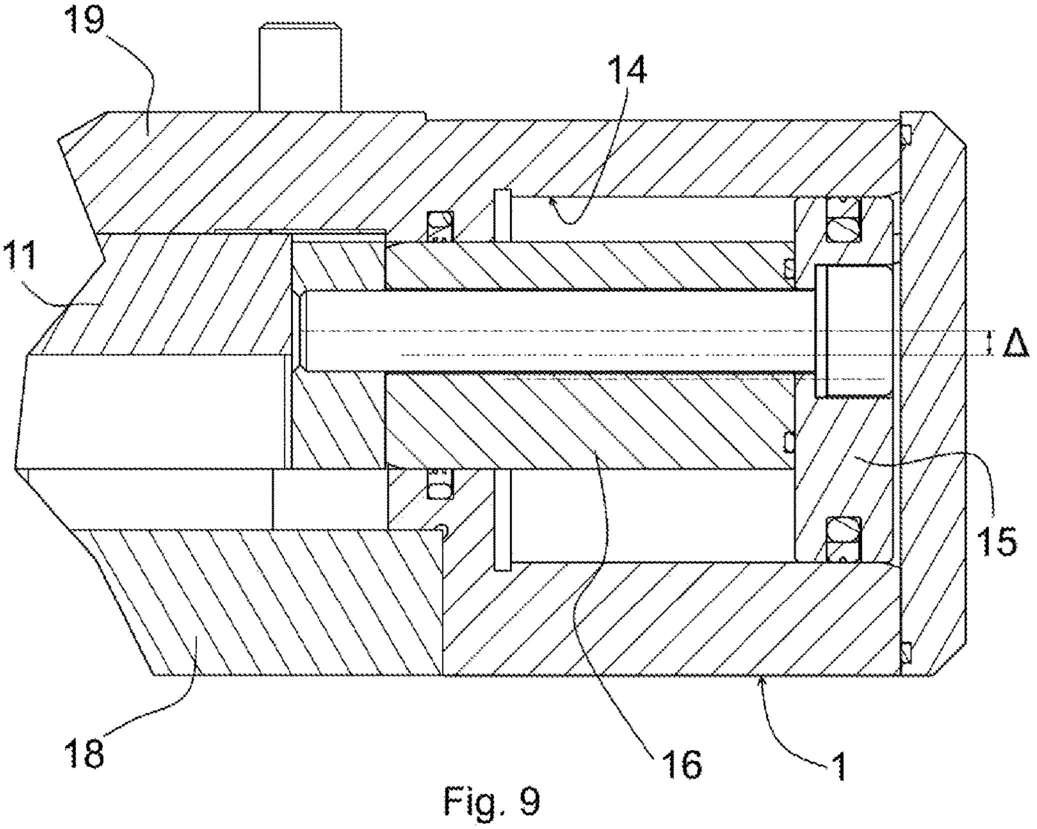
FIG. 9 is an enlargement of the frame A of FIG. 8.
Figure 11:
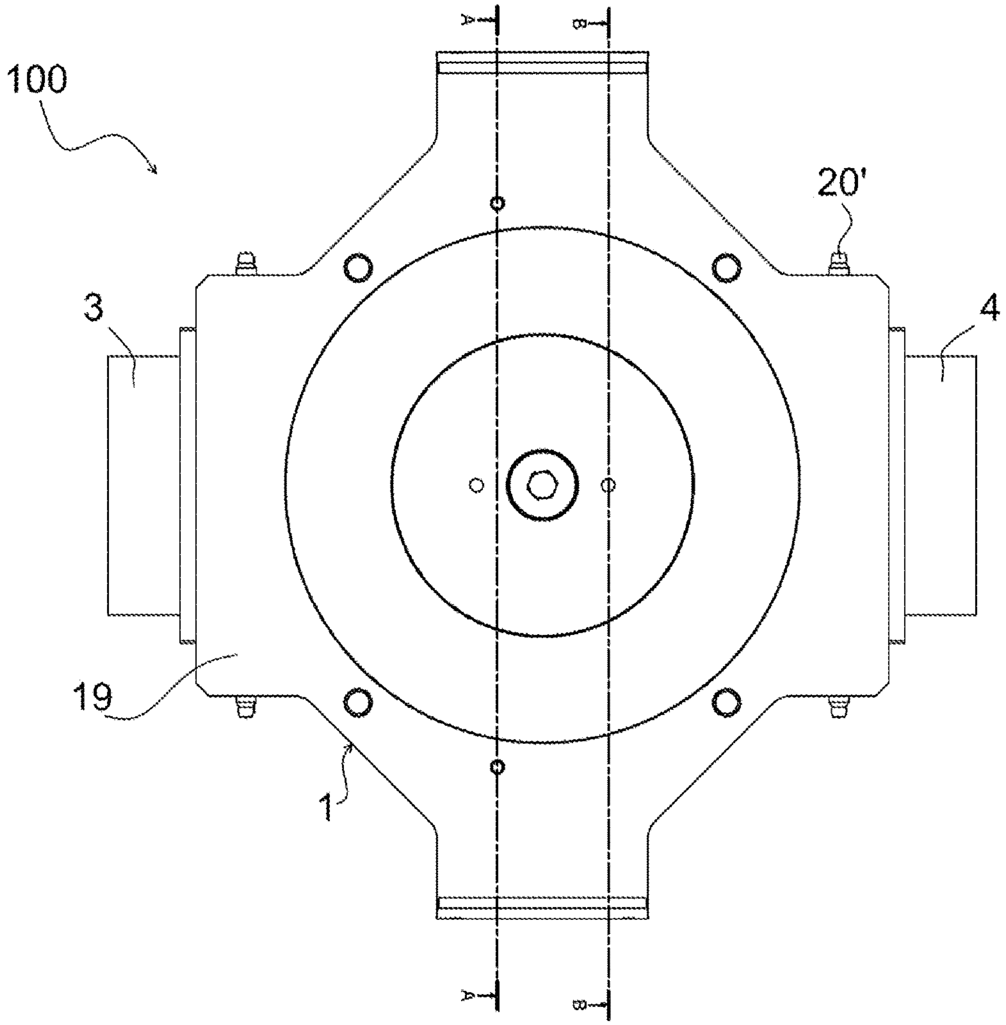
FIG. 11 is a plan view of the vise shown in FIG. 1.

FIG. 8 is a sectional vertical view of the vise 100 considered on the plane M-M of FIG. 11. It can be seen that the shaft 16 of each actuator 6-7 is offset from the respective piston 15, i.e., the elements 15 and 16 are not coaxial. This feature is best seen in FIG. 9, which is an enlargement of the portion A of FIG. 8. As can be seen, there is an offset A of, for example, 3 mm between the axis of the piston 15 and the axis of the shaft 16. The reason why this configuration is preferable is that the wall of the body 1 of the vise can be thickened where necessary, without this leading to an increase in the overall height H of the vise 1: as will be described later, the passages 20 for delivering the pressurized oil can be made in the thickened wall, as an alternative to the solution of arranging pipes or ducts outside the body 1.

Figure 10:
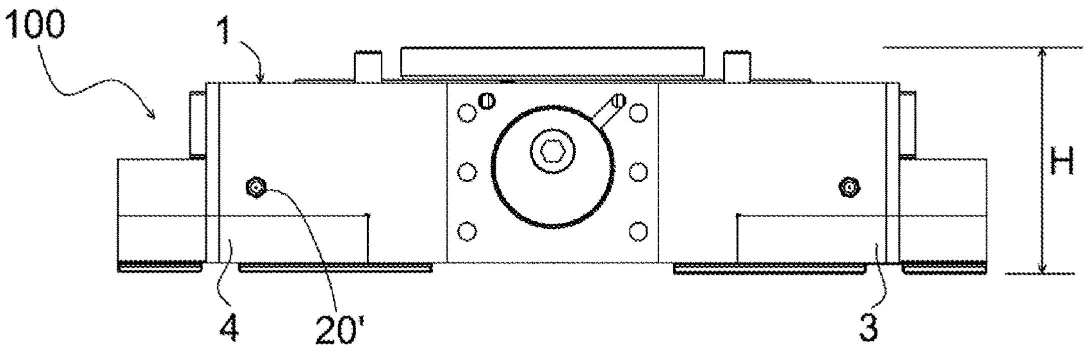
FIG. 10 is an elevation view of the vise shown in FIG. 1.

FIG. 10 shows the vise 100 in a front and elevation view: The reference H denotes the height of the vise 100. Advantageously, the height H of the vise 100 is 69.5 cm. Although this value is relatively low; the clamping force of the jaws 3 and 4 is more than 2000 kg. More specifically, the vise 100 made without anti-friction surface treatments and without roller bearings 22, but by providing for the simple sliding of the jaws 3 and 4 into their respective seats 3' and 4, it provides a clamping force of approximately 2220 kg. By making the vise 100 as shown in the figures, i.e., with the roller bearings 22 and the ground races 22', the clamping force of the jaws 3-4 is just over 3000 kg.

FIG. 11 shows the vise 100 in a top, plan, view. Reference 20' in FIGS. 10 and 11 denotes supply nozzles of the pressurized oil.

Figure 12:
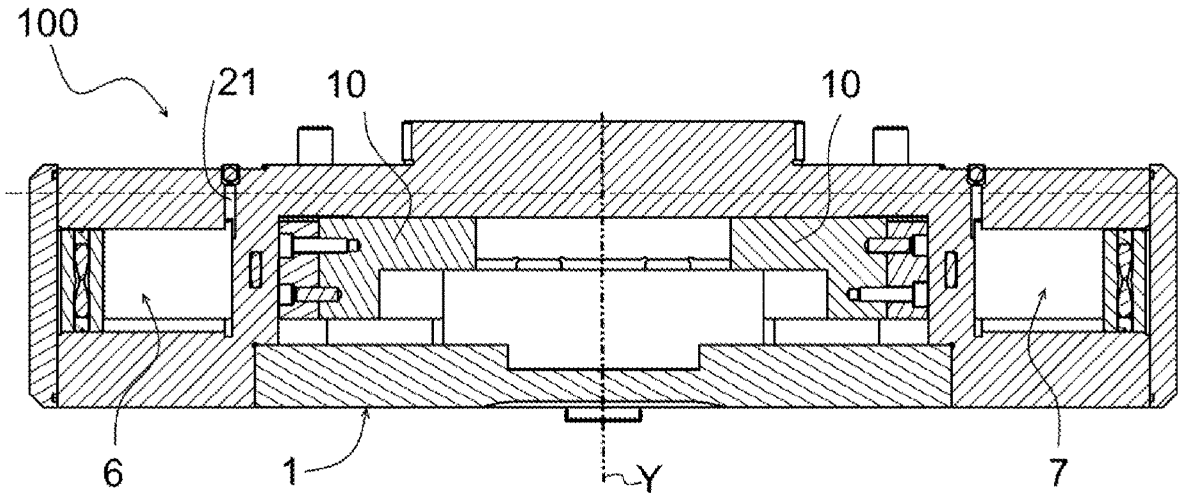
FIG. 12 is a (vertical) sectional view of the vise shown in FIG. 1, considered on the plane A-A of FIG. 11.
Figure 13:
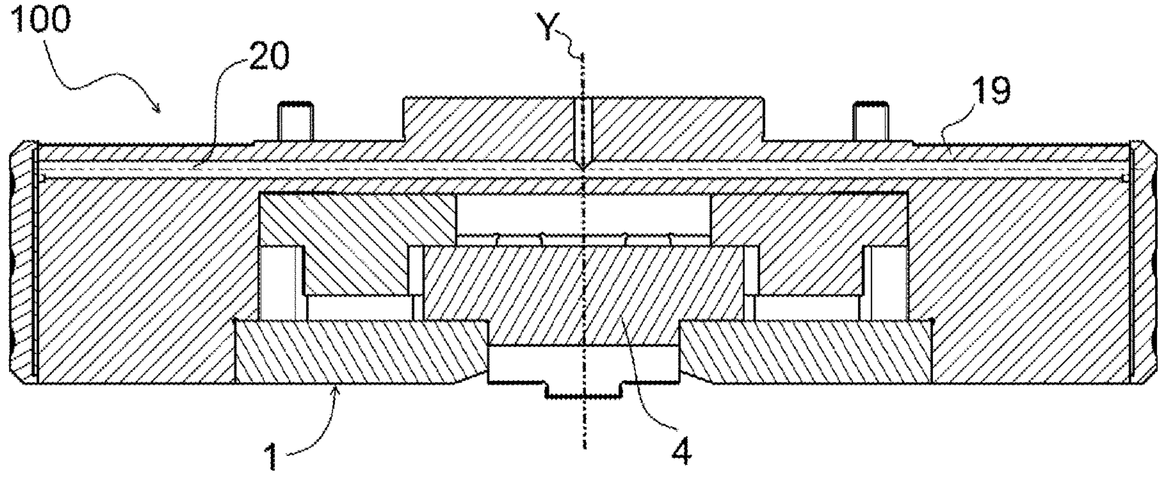
FIG. 13 is a (vertical) sectional view of the vise shown in FIG. 1, considered on the plane B-B of FIG. 11.

FIG. 12 is a vertical sectional view of the vise 100 considered in the plane A-A of FIG. 11, and FIG. 13 is a vertical sectional view of the vise 100 considered in the plane B-B of FIG. 11. These sections show the passages 20 and 21 obtained in the body 1 of the vise 100 for the pressurized oil delivery. The passages 20 and 21 extend at the thickened wall 19 of the body 1 of the vise 100.

Figure 14:
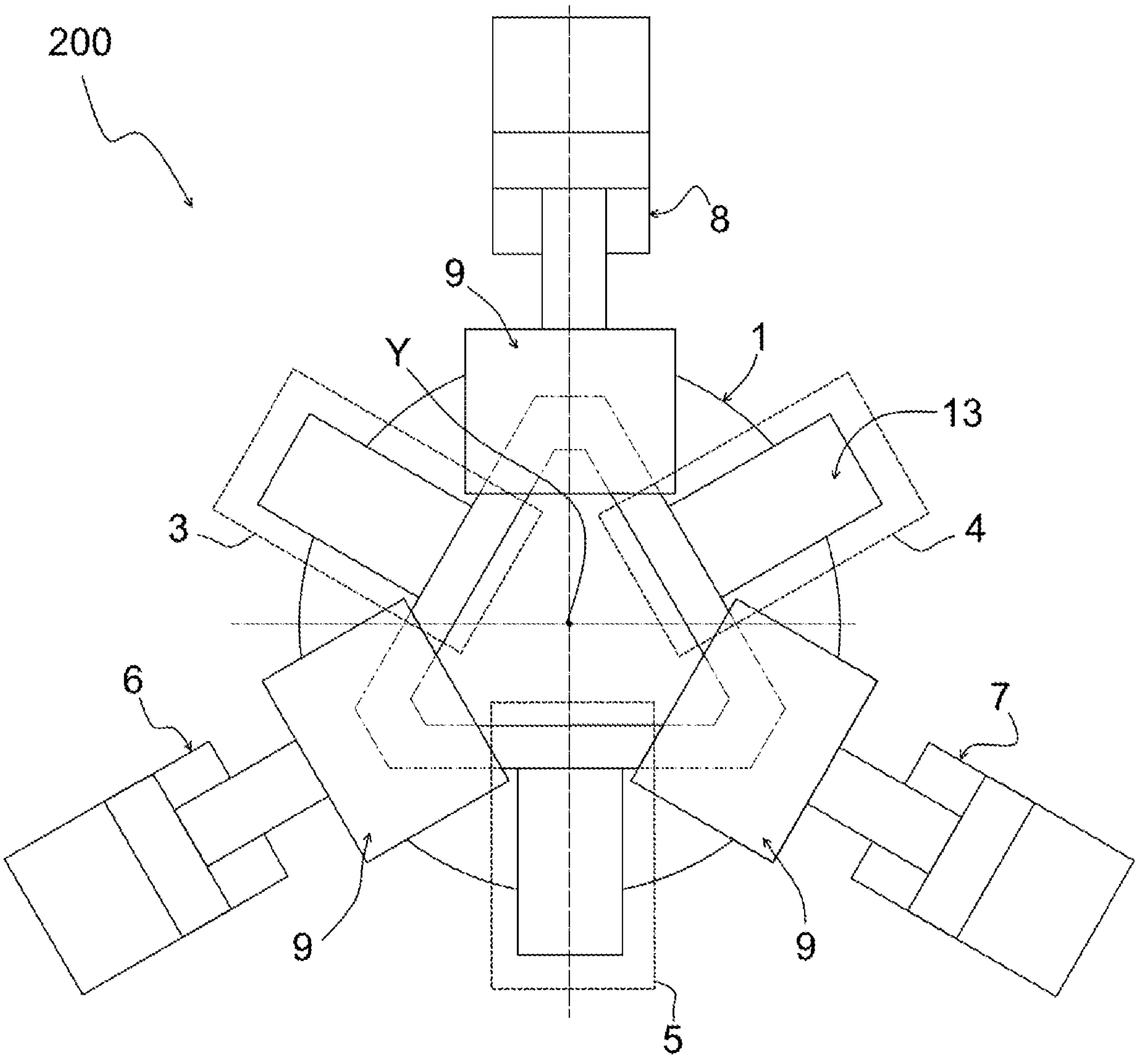
FIG. 14 is a schematic plan view of a second embodiment of the vise according to the present invention, having three jaws.

FIG. 14 is a schematic and plan view of a second embodiment 200 of the vise according to the present invention. The vise 200 differs from the vise 100 in that it includes three jaws 3-5 arranged in a 120° configuration around the workpiece gripping axis Y, and three actuators 6-8 also arranged in a 120° configuration around the axis Y. The actuators 6-8 alternate with the jaws 3-5, meaning that an actuator 6-8 is interposed between two jaws 3-5 and each actuator applies its thrust simultaneously on two jaws. This configuration can be defined as an inverted triple wedge.

The invention claimed is:

1. A self-centering vise comprising a body, two or more jaws constrained to the body and actuators of the jaws,

- wherein the jaws are movable with respect to the body, on a lying plane of the jaws, close to and away from a workpiece gripping axis, to clamp a workpiece on said workpiece gripping axis and to release the workpiece, in response to the stresses imparted by said actuators, and;
- characterized in that
- each actuator comprises a thrust element susceptible to displacements parallel to the lying plane of the jaws in response to the stresses imparted by a fluid fed to the vise, and
- each jaw comprises two guides inclined and symmetrical with respect to a displacement direction of the jaw, and
- said thrust element comprises two walls inclined and symmetrical with respect to a displacement direction of the same thrust element, and
- each actuator exerts its own thrust simultaneously on two of the jaws by slidingly engaging the guides of the two jaws with its own inclined walls.

2. The vise according to claim 1, wherein the displacement direction of the jaw is transverse to the displacement direction of the corresponding thrust elements, and at most is orthogonal with only two of the jaws.

3. The vise according to claim 1, wherein the actuators are hydraulic or pneumatic and each comprise a cylinder obtained in the body of the vise, a piston movable in the cylinder, wherein the thrust element is outside the cylinder and is fixed to the piston to move together therewith, and the piston is susceptible to forward and backward movements depending on whether a pressurized fluid is fed into the cylinder upstream or downstream of the piston.

4. The vise according to claim 3, comprising a shaft connecting the piston to the inclined walls, wherein said shaft is slidingly and sealingly inserted through a corresponding seat of the body, and wherein the shaft is offset from the piston.

5. The vise according to claim 4, wherein the cylinder is included between an upper wall and a lower wall of the body, and delivering passages to deliver a pressurized fluid are obtained in either of the upper wall and the lower wall, in distal relation with respect to the shafts of the actuators.

6. The vise according to claim 3, wherein the angle between the inclined walls of the actuators is included in the range 20°-60°, and corresponds to the angle between the guides of each jaw.

7. The vise according to claim 1, wherein the inclined walls slidingly inserted into the corresponding guides of the jaws achieve an inclined-plane coupling.

8. The vise according to claim 1, comprising the two jaws opposite each other with respect to the workpiece gripping axis and translatable along a first direction, or first axis of displacement, and the two actuators opposite each other with respect to the workpiece gripping axis, wherein the thrust elements of the actuators move along a second direction, or second axis of displacement, orthogonal to the first direction, or first axis of displacement, according to a configuration defined double inverted wedge configuration.

9. The vise according to claim 8, wherein the angle between the inclined walls of the actuators is 30°.

10. The vise according to claim 1, comprising three of the jaws arranged around the workpiece gripping axis, with a 120° configuration, and three of the actuators arranged around the workpiece gripping axis, with a 120° configuration, wherein each actuator is interposed between two of the adjacent jaws.

11. The vise according to claim 1, comprising a roller bearing interposed between the body of the vise and each jaw, wherein the rollers define the lying plane of the jaws.

12. The vise according to claim 11, wherein the roller bearings comprise an elastic element, and wherein the elastic element is elastically deformable between a deformed configuration, at which the elastic element is squeezed between the rollers and the body of the vise, when the jaws are closed, and an undeformed configuration, when the jaws are open.

13. The vise according to claim 12, wherein the elastic element is positioned radially more inwardly of the rollers with respect to the workpiece gripping axis.

14. Use of the vise according to claim 12, wherein in a numerically controlled machine tool, for clamping and holding the workpiece on the workpiece gripping axis, wherein the actuators are activated to push the jaws, which simultaneously move to close on the workpiece, thus causing the elastic element to deform, and to loosen the grip of the jaws on the workpiece, as much as needed to return the elastic element to the undeformed configuration, while still holding the workpiece.

* * * * *